3,751,484
TRANSMETHYLATION PROCESS
Noland Poffenberger and William David Watson, Midland, Mich., assignors to The Dow Chemical Company, Midland, Mich.
No Drawing. Filed Feb. 12, 1971, Ser. No. 115,098
Int. Cl. C07c 41/00
U.S. Cl. 260—612 R    6 Claims

ABSTRACT OF THE DISCLOSURE

Diphenyl oxide (diphenyl ether) is methylated by reaction with a methylated benzene at about 100–200° C. and in the presence of a mixture of HF and $BF_3$.

BACKGROUND OF THE INVENTION

While transalkylations of aromatic compounds wherein the alkyl groups contain at least two carbon atoms are well known, the methyl group is highly resistant to such transfer. Transmethylations involving methyl groups have apparently been limited heretofore to mononuclear aromatic hydrocarbons.

SUMMARY OF THE INVENTION

According to the invention, diphenyl oxide (hereinafter DPO) is methylated by a transmethylation reaction with methylated benzene in the presence of a mixture of HF and $BF_3$.

The reaction may be conducted under a wide range of conditions. Thus, suitable temperatures include the range of about 100–200° C. At 100° the reaction is relatively slow while at 200° substantial amounts of tar and other by-products are produced. Preferred temperatures are about 120–160°.

The methylating reactant may be any methylated benzene, e.g., toluene, the xylenes, dureen or mellitene. The term "methylated benzene" as used herein, means any compound of the formula

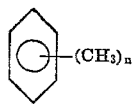

wherein $n$ is 1–6, and mixtures thereof. The position of the methyl groups on the benzene ring is relatively unimportant, transmethylation being obtainable with all of the isomers. As a practical matter, toluene and the mixed xylenes are the preferred methylating agents.

Since the methylation process of the invention is readily controllable to produce mono- or higher-methylated DPO as desired, the invention includes the further methylation of partially methylated DPO and it is to be understood that the language "methylation of DPO" is meant to include such methylation of partially methylated DPO.

In practicing the invention, the degree of methylation effected is controlled by the appropriate control of proportions of reactants, temperature and/or time of reaction.

While previously known transalkylations can usually be effected by use of a wide variety of Friedel-Crafts catalysts, it has been found that the present process requires specifically a mixture of HF and $BF_3$. While neither of these alone is effective, mixtures of the two over a wide range of proportions are effective. The molar ratio of HF to $BF_3$ may suitably vary from about 10:1 to about 50:1, the preferred ratio being 15:1 to 25:1.

Since the reaction takes place in the liquid phase, the pressure should be at least as high the autogenous pressure of the reaction mixture. Its magnitude will thus depend on the temperature and the proportions and identity of the methylating reactant. Ordinarily it will be in the range of about 200–1000 p.s.i.

The proportion of catalyst used in the reaction mixture is not critical and may be varied widely. Since HF is the major component of the catalyst, it is convenient to express the proportion as moles of HF per mole of combined reactants. If this is less than about one the reaction may be inconveniently slow, while if it exceeds about 10 such excessive amounts produce little or no increase in reaction rate and are uneconomical. Preferred ratios are about 2:1 to 5:1.

Most of the catalyst and unconverted reactants can be recovered and recycled to the process. Likewise partially demethylated reactant and partially methylated products can be recycled and further reacted.

SPECIFIC EMBODIMENTS

The following examples illustrate the practice of the invention. A stainless steel bomb was loaded with DPO, mixed xylenes consisting essentially of ortho- and para-xylene in the ratio 1:2, and catalyst, in the ratios shown in Table I, and then heated for the indicated times and temperatures. At the end of the reaction period, the bomb was cooled and vented to the atmosphere. It was then heated at 30° C. overnight, while vented, to remove most of the catalyst. For analysis, a small aliquot was neutralized with saturated aqueous $NaHCO_3$, taken up with ether and analyzed by gas chromatography at 300° C. Results are shown in Table II.

TABLE I.—REACTANTS AND REACTION CONDITIONS

| Example No. | Temp., ° C. | Time, hr. | Pressure, p.s.i. | Charge, molar ratios | | |
|---|---|---|---|---|---|---|
| | | | | DPO/ xylene | Organics/ HF | HF/ $BF_3$ |
| 1 | 125 | 5 | 260 | 3.82 | 0.19 | 17 |
| 2 | 150 | 6 | 400 | 2.00 | .20 | 18 |
| 3 | 150 | 5.5 | 400 | .50 | .50 | 17 |

TABLE II.—ANALYSES OF PRODUCTS

| | Weight percent | | |
|---|---|---|---|
| | Ex. 1 | Ex. 2 | Ex. 3 |
| Benzene | | 1.6 | 56.6 |
| Toluene | 1.9 | 11.4 | 14.5 |
| Xylenes | 8.3 | 5.7 | 8.3 |
| Trimethylbenzenes | .7 | 3.6 | 1.4 |
| Diphenyl oxide | 81.9 | 54.1 | 4.2 |
| Tolyl phenyl ethers | 7.2 | 22.1 | 6.0 |
| Highers | | 1.5 | 9.0 |

In Example 2, 39% of the DPO charged was converted to monomethyl DPO, thus consuming a similar proportion of the available methyl groups in the xylene charged.

In Example 3, polymethylated DPO was found in the highers. It was shown by mass spectroscopy that the ratio of mono-, di-, tri-, tetra- and penta-methylated DPO produced in the reaction was 1:0.9:0.3:0.07:0.009.

We claim:

1. The process of methylating diphenyl oxide comprising reacting by contacting diphenyl oxide with methylated benzene in the liquid phase at a temperature of about 100°–200° C. in the presence of a catalytic mixture of HF and $BF_3$ wherein the molar ratio of HF to $BF_3$ is about 10:1 to 50:1 and the molar ratio of HF to combined reactants is about 1:1 to 10:1.

2. The process of claim 1 wherein the methylated benzene is xylene.

3. The process of claim 1 wherein the reaction temperature is about 120–160° C.

4. The process of claim 1 wherein the molar ratio of HF to BF$_3$ is about 15:1 to 25:1.

5. The process of claim 1 wherein the molar ratio of HF to combined reactants is about 2:1 to 5:1.

6. The process of claim 2 wherein the reaction temperature is 120–160° C., the ratio of HF to BF$_3$ is 15:1 to 25:1 and the ratio of HF to combined reactants is 2:1 to 5:1.

References Cited

UNITED STATES PATENTS

| | | | |
|---|---|---|---|
| 3,249,645 | 5/1966 | Suld | 260—672 T |
| 2,396,965 | 3/1946 | Passino | 260—672 TX |
| 2,480,939 | 9/1949 | Lee et al. | 260—672 TX |

BERNARD HELFIN, Primary Examiner